US012607257B2

(12) United States Patent

Flogaus et al.

(10) Patent No.: US 12,607,257 B2

(45) Date of Patent: Apr. 21, 2026

(54) TRANSMISSION ARRANGEMENT WITH A SHIELDING SHELL AND MOTOR VEHICLE WITH THE TRANSMISSION ARRANGEMENT

(71) Applicant: ZF Friedrichshafen AG, Friedrichshafen (DE)

(72) Inventors: Claudius Flogaus, Markdorf (DE); Julia Klein, Langenargen (DE); Martin Kibler, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/933,784

(22) Filed: Oct. 31, 2024

(65) Prior Publication Data

US 2025/0137524 A1 May 1, 2025

(30) Foreign Application Priority Data

Oct. 31, 2023 (DE) ..................... 10 2023 210 771.6

(51) Int. Cl.
*F16H 57/04* (2010.01)
*F16H 48/08* (2006.01)
(Continued)

(52) U.S. Cl.
CPC ......... *F16H 57/0423* (2013.01); *F16H 48/40* (2013.01); *F16H 57/037* (2013.01);
(Continued)

(58) Field of Classification Search
CPC ............. F16H 48/08–11; F16H 57/037; F16H 57/038; F16H 57/0483;
(Continued)

(56) References Cited

U.S. PATENT DOCUMENTS 9,470,303 B2 * 10/2016 McPeak .............. F16H 57/0423
9,803,741 B2 * 10/2017 Ohmura .............. F16H 57/0428
(Continued)

FOREIGN PATENT DOCUMENTS

DE 11 2014 002 195 T5 1/2016
DE 10 2021 132 154 B3 5/2023
(Continued)

OTHER PUBLICATIONS

Office Action dated Jun. 6, 2024 for German Patent Application No. 10 2023 210 771.6 (9 pp.), note: pp. 1 and 2 are English language Explanations to Section C. Result of Determination Document.

*Primary Examiner* — James J Taylor, II

(74) *Attorney, Agent, or Firm* — Crowell & Moring LLP

(57) ABSTRACT

A transmission assembly for a motor vehicle includes a transmission housing, a spur gearing in the housing having an input gear and an output gear, which are connected to one another, a differential gearing in the housing, wherein the differential gearing has a differential cage connected to the output gear for conjoint rotation, and numerous compensating gears rotatably supported in the cage, a sump that defines a fluid level in the transmission housing when the installed transmission assembly is stationary, and a shielding shell in the transmission housing, which surrounds the output gear and the differential cage, at least below the fluid level, to shield them against the sump, wherein the shell has a first channel, wherein fluid in the shell can be conveyed from the shell along the first channel to at least one area in the transmission assembly.

14 Claims, 9 Drawing Sheets

(51) Int. Cl.
    *F16H 48/40*        (2012.01)
    *F16H 57/037*      (2012.01)

(52) U.S. Cl.
    CPC ..... *F16H 57/0424* (2013.01); *F16H 57/0427*
         (2013.01); *F16H 57/0471* (2013.01); *F16H*
         *48/08* (2013.01); *F16H 57/0457* (2013.01);
                   *F16H 57/0461* (2013.01)

(58) Field of Classification Search
    CPC ... F16H 57/0421–0423; F16H 57/0427; F16H
                            57/0461
    See application file for complete search history.

(56)               References Cited

U.S. PATENT DOCUMENTS

| | | | |
|---|---|---|---|
| 10,018,265 | B2 * | 7/2018 | Kito .................... F16H 57/0423 |
| 10,047,851 | B2 * | 8/2018 | Kim .................... F16H 57/0424 |
| 10,060,519 | B2 * | 8/2018 | Matsubara ........... F16H 57/037 |
| 10,302,185 | B2 * | 5/2019 | Kawakami ......... F16H 57/0479 |
| 2014/0054114 | A1 | 2/2014 | Isomura et al. |

FOREIGN PATENT DOCUMENTS

| | | |
|---|---|---|
| EP | 1 635 090 A2 | 3/2006 |
| JP | 2017-082838 A | 5/2017 |

* cited by examiner

TRANSMISSION ARRANGEMENT WITH A SHIELDING SHELL AND MOTOR VEHICLE WITH THE TRANSMISSION ARRANGEMENT

CROSS-REFERENCE TO RELATED APPLICATION

This application claims priority to German Patent Application No. 10 2023 210 771.6, filed on Oct. 31, 2023, the entirety of which is hereby fully incorporated by reference herein.

TECHNICAL FIELD

The present disclosure relates to a transmission assembly for a motor vehicle that has the features as disclosed herein. The present disclosure also relates to a motor vehicle with this transmission assembly.

BACKGROUND

Electric drive trains are increasingly used to power electric and/or hybrid vehicles. These drive trains normally contain an electric machine, in particular an electric motor, and a downstream reduction gearing, which reduces the rotational movement generated by the electric motor. This reduction gearing can be connected to one or more vehicle wheels through a differential gearing to convey the rotation thereto. There are shields for reducing drag losses in the reduction gearing and the differential gearing that shield the transmission components from a lubricant sump.

EP 1 635 090 A2 discloses a fluid drain structure comprising a transmission housing that encloses a rotating element in a chamber, a fluid reservoir for the fluid drained from the rotating element chamber, a fluid drain channel from the chamber to the reservoir, and a deflection plate placed between the transmission housing and the rotating element in the chamber to enclose a lower part of the rotating element, such that the fluid surrounding the rotating element is distributed to a rotating element side and a transmission housing side of the chamber, wherein the deflection plate has a drain hole lying opposite a lateral surface of the rotating element, and an opening in the oil drain channel is opposite one side of the chamber, such that oil diverted by the plate is drained through the hole on the rotating element side into the drain channel.

SUMMARY

An object of the present disclosure is to create a transmission assembly with a better lubrication concept.

This problem is solved by a transmission assembly that has the features as disclosed herein and a motor vehicle that has the features as disclosed herein. Preferred or advantageous embodiments can be also derived from the following description and/or the drawings.

The present disclosure results in a transmission assembly for a motor vehicle. In particular, the transmission assembly is used to convert and distribute a torque or output from a drive unit, in particular an electric machine, to at least one wheel on the motor vehicle.

The transmission assembly has a housing. The housing is used to contain all of the transmission components. The housing is advantageously designed as a wet chamber sealed against the environment. The transmission assembly can be attached to the drive unit by the housing.

The transmission assembly has a spur gearing contained in the housing, which is designed and/or configured to translate the input torque to an output torque. The spur gearing is designed to convert a high rotational rate and low torque to a low rotational rate with a higher torque. The spur gearing preferably has a ratio of i>1. In other words, the spur gearing forms a reduction gearing.

The spur gearing has an input gear and an output gear, which are connected to one another in the transmission housing. In theory, the input gear and output gear can mesh directly with one another. They can also be connected by one or more intermediate gears, preferably a stepped gear. In particular, the input gear is powered by the drive machine. The input gear can be connected by a shaft to the drive unit. The input gear, output gear and intermediate gear, if applicable, are preferably spur gears.

The transmission assembly contains a differential gearing in the housing that is designed to distribute the drive torque. The differential gearing is preferably designed to distribute the drive torque to at least two wheels on the vehicle, in particular a left and right wheel. This type of differential gearing is also referred to as an axle differential. The differential gearing can also be designed to distribute the drive torque to at least two axles, in particular a front and rear axle in the vehicle. This type of differential gearing is also referred to as a central or longitudinal differential.

The differential gearing has a differential cage connected to the output gear for conjoint rotation, numerous compensating gears in the differential cage, and first and second output shafts connected by the compensating gears. Torque can preferably be transferred from the output gear to the differential cage, and from there to the output shafts via the compensating gears. In theory, the differential gearing can be a spur gear differential, in which the compensating gears are spur gears. The differential gearing preferably has beveled gears, however, functioning as the compensating gears. These compensating gears are preferably rotatably supported by bearing pins in the differential cage. In particular, the output gear is offset on the outside of the cage such that it is off-center.

The transmission assembly contains an oil sump that defines the fluid level in the transmission housing when the transmission assembly is stationary in its installed state. In particular, the sump is at the bottom of the transmission housing. This is preferably a dry sump. The sump preferably contains transmission fluid in the housing. The transmission fluid is preferably used to cool and/or lubricate the components of the transmission while it is in use.

The transmission assembly also contains a shielding shell in the housing, which surrounds the output gear and differential cage, at least below the fluid level, in order to shield them against the sump. In particular, the shell shields a transmission chamber for the spur gearing and the differential gearing from the sump. This shell is closed, and/or fluid-tight, at least below the fluid level.

It is proposed that the shell have a first fluid-conducting channel through which the fluid in the shell can be conveyed by a rotation of the output gear from the shell, along this first channel, to at least one area in the transmission assembly where it is needed. This movement by the output gear is preferably exploited to convey fluid in the shell or transmission chamber with its gear teeth when it rotates. This first channel is preferably placed in an oil flow generated by the output gear such that most of the fluid conveyed by the output gear is conducted through it to where it is needed. Specifically, the fluid flows from the bottom of the shell, via the output gear and first channel, to the at least one area where it is needed. In particular, a fluid-conducting channel is understood to mean a channel through which fluid is deflected, drained, and/or diverted. The area requiring fluid can be a lubrication or supply area. A lubrication area contains a bearing or gear teeth for one or more transmission components in the spur gearing and/or differential gearing. A supply area is where a pump suctions up fluid.

The present disclosure is based on the idea that while a vehicle is in motion, i.e. traveling up or down an incline, accelerating, braking, cornering, etc., or when transmission components are being actively lubricated, fluid can travel from the sump into the shell or the transmission chamber. To prevent further drag losses and ensure sufficient fluid supply, the fluid must be drained from the shell and returned to the sump. The transmission components must also be lubricated effectively.

The advantage of the present disclosure is that the first channel allows fluid to be supplied through the movement of the output gear to individual transmission components, while draining fluid from the transmission chamber in a simple manner. This results in a transmission assembly with an improved lubrication concept, in which the first channel forms a passive fluid supply to individual components of the transmission. Moreover, drag losses and foaming of the fluid in the transmission chamber are significantly reduced, substantially increasing the efficiency of the transmission assembly.

In an embodiment of the present disclosure, the first fluid-conducting channel has multiple stages. This first channel contains at least two successive fluid stages, through which a portion of the fluid conveyed by the output gear can be conducted to different areas requiring fluid. In particular, the at least two stages are successive in the flow generated by the output gear, such that a portion of the fluid can be conveyed by a first stage to a first area, and another portion, or the rest, can be conveyed by a second stage to a second area, and so on. The flow path is preferably subdivided into numerous subsidiary flow paths by these stages. In other words, a portion of the fluid is diverted in each of these different stages. By way of example, most of the fluid, i.e. more than 50%, can be diverted by the first stage. Simply put, the stages at least partially divert excess fluid toward the circumference. Specifically, the first channel has at least two stages over the circumference of the output gear and/or the differential cage, preferably precisely three stages. The different areas can be prioritized by the placement of the stages, such that they receive different amounts of fluid.

In an embodiment, at least one stage is formed by a first fluid deflector, which is adjacent to the input gear. In particular, this deflector acts directly on the fluid with the input gear when it moves. The first deflector is designed to divert at least part, in particular most, of the flow generated by the output gear, and conduct it to one of the areas requiring fluid, in particular the first of these. The first deflector can be placed on the upper surface of the output gear, in particular between the 9 o'clock and 12 o'clock positions thereon, when the output gear is in the intended installation position. Specifically, the first deflector is placed substantially, or precisely, at the 11 o'clock position.

In this embodiment, the first deflector has an edge facing the output gear with which part of the fluid is extracted, and a fluid guide for conducting this portion of the fluid to one of the areas where it is required, in particular the first of these. The fluid conveyed by the output gear is at least partially removed from the output gear by the edge of first deflector, and is then conducted to the first area where it is required by the fluid guide. This edge is preferably at a substantially or precisely right angle to the direction of rotation and/or extends axially in relation to the rotational axis. This edge preferably extends over the entire axial width of the output gear. The fluid guide can be a partially open or closed channel, and it can change direction at least once. The deflector therefore ensures that at least some of the fluid conveyed over the circumference is removed and conducted to a first area where it is required. This deflector can be used in a simple manner to determine the amount of fluid that is diverted through its placement in relation to the output gear.

The differential cage can be in the first area requiring fluid, and the fluid guide can connect the deflector to a drip edge above the differential cage. In particular, the fluid diverted by the deflector can drip onto the differential cage from the drip edge. This drip edge is preferably at the end of the fluid guide, in order to be able to conduct the diverted fluid away from the deflector. In particular, the drip edge is in the axial middle of the differential cage and/or the bearing pin. The drip edge can also be at the top of the differential cage, at substantially or precisely the 12 o'clock position, when in the intended installation position. This results in a shielding shell with which fluid can be conducted to the differential cage in a targeted manner, sufficiently lubricating the differential cage, and therefore the compensating gears therein.

In one embodiment, at least one more fluid-conducting stage is formed by a second fluid deflector, which is adjacent to the output gear, downstream of the first deflector. In particular, the first and second deflectors are offset and spaced apart over the circumference in relation to the rotational axis of the output gear. The second deflector diverts at least part of the remaining fluid downstream of the first deflector, and conducts this to one of the areas requiring fluid, in particular the second such area. The second deflector can be placed at the top of the output gear when it is in the intended installation position, in particular between the 12 o'clock and 3 o'clock position. Specifically, the second deflector is substantially or precisely at the 1 o'clock position.

In this embodiment, the second deflector has an edge facing the output gear for extracting another portion of the fluid, and a fluid guide for conducting this fluid to an area where it is needed, in particular the second area. In particular, at least part of the fluid conveyed by the output gear is removed by the edge of the deflector, and conducted by the fluid guide to the second area where it is needed. This edge of the second deflector is preferably parallel to and/or aligned with the edge of the first deflector. Particularly preferably, the edge of the second deflector extends axially over the entire width of the output gear. The fluid guide on the second deflector can be formed by a partially open or closed channel, through which the fluid is conducted, and/or changes direction at least once. The second deflector results in a simple means of conveying at least part of the fluid to another area where it is needed.

In another embodiment, the differential cage is rotatably supported in the transmission housing by at least one, preferably two differential cage bearings. The differential cage bearings can be sliding bearings, but are preferably roller bearings. The differential cage bearings preferably bear at one end on the differential cage, and at the other on the transmission housing, in particular a section thereof. The two bearings are spaced apart axially. The output gear is preferably between the two bearings and the differential cage. The second area requiring fluid is at one of the bearings, where the fluid guide connects the deflector to a drip edge above the bearing. One of the bearings is preferably inside the shielding shell, and the other is outside, where it can be supplied with fluid by the second fluid-conducting stage. The fluid can drip directly from the drip edge onto the bearing. The fluid dripping from this edge could also be supplied to the bearing via the housing section. By way of example, this section of the transmission housing can have one or more lubrication holes near the bearing, preferably near the bearing seat, through which the fluid can be supplied to the bearing. This results in a shielding shell in which the excess fluid is used to lubricate and/or cool the bearing. This increases the service life of the at least one bearing.

In another design, the at least one fluid-conducting stage is formed by a spin-off channel adjacent to the output gear. This spin-off channel can be upstream of the first and/or second fluid deflector, such that some fluid is first diverted there, and another portion of the fluid is then extracted by the first and/or second deflector. It can also be downstream of the first and/or second deflector, such that a first portion of the fluid is extracted by the first and/or second deflector, and the remaining fluid is then diverted by the spin-off channel. In the intended installation position, this channel is preferably between the 8 o'clock and 10 o'clock position on the output gear, preferably at substantially or precisely the 9 o'clock position.

In this embodiment, the spin-off channel has spin-off edge facing away from the output gear, which is designed to divert fluid to at least one area where it is required. In particular, this channel supplies the rest of the fluid in the shell, after passing the first and/or second deflector, to one or more transmission components. This spin-off edge preferably ensures that the fluid conveyed by the rotation of the output gear is distributed radially and/or at a tangent to the direction of rotation. This edge is preferably substantially or precisely at a right angle to the direction of rotation and/or extends in the axial direction in relation to the rotational axis. This edge preferably extends axially over the entire width of the output gear. In particular, the shell is interrupted on its circumference to form the spin-off edge. This allows the remaining fluid in the shell to be supplied in a targeted manner to one or more transmission components, in particular the spur gearing.

In another embodiment, a meshing point for the input and/or output gears is a third area requiring fluid, and the spin-off edge is below this point. In particular, fluid is diverted from the spin-off edge by centrifugal force toward this meshing point. The edge is below the point where the output gear meshes with the intermediate gear. The fluid can preferably be diverted toward the meshing point at the spin-off edge by the centrifugal force generated by the rotation of the output gear. This also results in a passive cooling of the spur gearing. The flow path is thus divided into numerous subsidiary flow paths, the first of which is directed by the first deflector to the first area, the second being directed by the second deflector to the second area, and a third being directed by the spin-off channel toward the third area.

In another design, the shielding shell has an additional fluid-conducting channel through which fluid in the shell can be conveyed by the rotation of the differential cage directly into the sump. In particular, the fluid that has been supplied through the first channel to the differential gearing, and/or excess fluid, is then returned through this additional channel to the sump. The rotation of the differential cage is preferably used to remove at least a portion of the fluid in the shell or in the transmission chamber through the outer channel.

The additional channel is preferably placed in a fluid flow generated by the differential gearing such it conducts most of the fluid in the differential cage to the sump. The additional channel preferably has just one stage. In particular, an additional fluid path is parallel to the first path from the differential cage through the additional channel to the sump. This channel further optimizes the efficiency of the differential gearing, because it prevents drag losses caused by excess fluid.

In one embodiment, the additional channel is formed by at least one additional deflector that is adjacent to the differential cage. In particular, the additional deflector acts directly on the fluid conveyed by the movement of the differential cage. The additional deflector preferably extracts at least part, preferably most, of the fluid flowing through the differential cage and conducts it directly to the sump. The additional deflector can be placed at the top of the differential cage in the intended installation position, in particular between the 9 o'clock and 3 o'clock position, preferably at substantially the 12 o'clock position. The additional deflector can have an edge facing the differential cage that diverts the fluid, and a fluid guide with which the fluid is guided into the sump. In particular, at least part of the fluid conveyed by the differential cage is removed therefrom by the edge of the deflector and then guided directly into the sump by the fluid guide. This edge is preferably at substantially or precisely a right angle to the direction of rotation and/or extends in the axial direction in relation to the rotational axis. The fluid guide can be formed by a partially open or closed channel through which the fluid flows and/or changes direction least once. By way of example, the fluid removed by the additional deflector can drip into the sump downstream of the fluid guide. This additional deflector ensures that at least some of the fluid conveyed circumferentially by the differential cage is extracted by the edge of the deflector, and conducted to the sump.

The transmission housing can have a second fluid-conducting channel through which fluid in the shielding shell can be conveyed by the rotation of a spur gear directly into the sump and/or to at least one area requiring fluid. In particular, the second channel conducts the fluid supplied to the spur gearing by the first channel to at least one other area, and/or returns excess fluid to the sump. The movement of one or more spur gears is preferably used to convey at least part of the fluid in the shell or transmission chamber through the outer channel. The second channel is preferably located in a flow generated by the spur gearing such that most of it is conducted through the second channel to the sump or another area where it is required. The second channel can have one or more stages. In particular, a second flow path is parallel to the first, and/or the additional flow path, from the at least one gear wheel through the second channel directly into the sump and/or at least one other area where fluid is required. This second channel further optimizes the efficiency of the spur gearing by preventing drag losses caused by excess fluid.

In one embodiment, the second channel has numerous stages. It contains at least two successive fluid-conducting stages through which a portion of the fluid is conveyed to at least one area requiring fluid, and/or directly to the sump. In particular, the at least two stages are successive in the flow generated by the intermediate gear, such that a portion of the fluid conveyed by the intermediate gear is diverted by a first stage to another area requiring fluid, and the rest is conveyed directly to the sump by the second stage. The second channel can also contain additional channels through which a portion of the fluid conveyed by the intermediate gear is diverted to other areas requiring fluid. Specifically, the second channel has at least two stages over the circumference of the output gear and/or the differential cage. A multi-stage second channel can therefore passively supply fluid to other areas where it is required.

In one embodiment, at least one stage in the second channel can be formed by a deflector, which is adjacent to the intermediate gear. In particular, the deflector acts directly on the fluid conveyed by the intermediate gear. The deflector preferably extracts at least a part, in particular most, of the flow generated by the intermediate gear and conveys it directly to the sump or another area where it is required. The deflector can be at the bottom of the intermediate gear when it is in the intended installation position, in particular between the 3 o'clock position and the 9 o'clock position, preferably at substantially the 6 o'clock position. The deflector can have an edge facing the intermediate gear for removing the fluid and a guide for conducting the fluid to the sump or another area where it is required. In particular, the fluid conveyed by the intermediate gear is removed from the intermediate gear by the edge of the deflector, and is then conveyed directly to the sump or other area where it is required by the guide. The edge of the deflector preferably extends at substantially or precisely a right angle to the direction of rotation and/or in the axial direction in relation to the rotational axis.

At least one of the stages in the second channel can be formed by a spin-off channel adjacent to the intermediate gear. This spin-off channel diverts a portion of the fluid into a fluid reservoir. The spin-off channel can be upstream of the deflector, such that it first diverts a portion of the fluid and a second portion of the fluid is subsequently extracted by the deflector. The spin-off channel can also be downstream of the deflector, such that a portion of the fluid is first extracted by the deflector, and another portion is subsequently diverted by the spin-off channel. This spin-off channel is formed on a side of the output gear, preferably between the 8 o'clock and 10 o'clock positions, preferably substantially or precisely at the 9 o'clock position. This fluid reservoir collects at least part of the fluid diverted into the transmission housing, where it is subsequently conveyed, e.g. through one or more holes in the housing, to an area requiring fluid, or directly to the sump. The spin-off channel can have an edge facing away from the intermediate gear, with which fluid can be diverted to at least one of the areas where it is required, and/or into the reservoir. This edge preferably ensures that the fluid conveyed by the output gear is diverted substantially radially and/or at a tangent to the direction of rotation. In particular, this spin-off edge is formed directly on the transmission housing, preferably as an integral part thereof.

In another embodiment, the shielding shell has at least one fluid intake opening, through which fluid is actively supplied by a pump. In particular, this opening is or can be connected to the pump. The suction end of the pump is preferably connected to the sump, and the outlet end is preferably connected to this opening, such that fluid can be conveyed from the sump to the intake opening by the pump. The at least one intake opening opens into an area where the input and/or output gear mesh. At least one intake opening preferably opens into a first meshing point between the input gear and the intermediate gear and/or at least one second intake opening opens into a second meshing point between the output gear and the intermediate gear. In particular, the meshing points between the spur gears can be actively supplied with fluid through the intake opening, which is then collected in the shell and subsequently supplied by the output gear and at least the first fluid conducting channel to one or more areas where it is required. This results in a particularly efficient and reliable lubrication of the transmission components.

In one embodiment, the shielding shell has a first section that surrounds the output gear and a second section that surrounds the differential gearing. The sections of the shell preferably shield the spur gearing and the differential gearing from the sump and guide the flow of fluid generated by the spur gearing and the differential gearing when in use. In particular, the first and second shell sections are integrally formed, preferably from the same piece of material. This shell can be made of sheet metal or injection molded plastic. The first section preferably fits to at least part of the output gear, preferably the outer teeth thereof. The second section preferably fits to at least part of the differential gearing, preferably the differential cage.

In this embodiment, the second section completely encompasses the differential gearing. This means that the second section of the shell is closed over its circumference. The circumference of the first section is interrupted, at least at the meshing point, and/or to form the spin-off channel. By way of example, the second section extends over more than 180°, preferably more than 270°. The first deflector and/or second deflector, and/or spin-off channel are preferably formed on the inner circumference of the first shell section. The additional deflector can be formed on the inner circumference of the second section. The shell can also have at least one other section that at least partially encompasses the input gear and/or the intermediate gear. By way of example, the additional section extends over more than 45°, preferably more than 90°, specifically more than 180°. The at least one intake opening is preferably formed in the additional section. The spur gearing and differential gearing are shielded from the sump, at least when the vehicle is not moving, by the circumferential shell sections, which also result in a controlled fluid flow when in use.

In another embodiment, the shell is held in place, at least in the axial direction in relation to the rotational axis of the differential gearing, between a first and second section of the transmission housing. In particular, the first section of the shell is held in place on the first housing section and the second is held in place on the second housing section, in the axial direction, and optionally in the radial direction, in a form-fitting manner. Preferably, the second section of the shielding shell has a circumferential radial step with which the shell is supported and/or centered coaxial to the rotational axis, at least on the second housing section in the axial and radial directions. The two housing sections can be separate sections that are joined to one another by threaded fasteners, for example, in the axial direction in relation to the rotational axis. This results in a particularly simple and inexpensive attachment of the shielding shell to the inside of the transmission housing, which requires no additional fasteners.

In this embodiment, the first shell section is sealed against the first housing section, at least below the fluid level, and the second shell section is sealed against the second housing section, at least below the fluid level. In particular, the shielding shell is sealed on both ends against preferably both parts of the transmission housing. The first shell section is preferably sealed by a first seal, in at least the axial direction, against the first housing section over part of its circumference. The second shell section is preferably sealed in the axial and/or radial directions in relation to the rotational axis against the second housing section over its circumference. The first and second seals can be made of elastomers. The spur gearing and/or differential gearing are preferably fully enclosed between the two halves of the housing, and/or shielded from the sump, by the shell. This results in a shielding shell that prevents leakages between the shell and the transmission housing, in particular when the vehicle is not moving, originating in the sump in the transmission chamber. The shell can therefore also be used as a sealing component for the transmission chamber.

The present disclosure also relates to a motor vehicle that has a transmission assembly like that described above. The vehicle is a motor vehicle, utility vehicle, or rail vehicle in particular. The vehicle is preferably an electric vehicle. The transmission assembly is specifically incorporated in a drive train in the vehicle between a drive unit, in particular an electric machine, and at least one wheel. The transmission assembly is preferably integrated in an electric axle, in particular an electric front or rear axle of the vehicle.

Further features, advantages, and effects of the present disclosure can be derived from the following description of preferred exemplary embodiments of the present disclosure.

DETAILED DESCRIPTION

Figure 1:
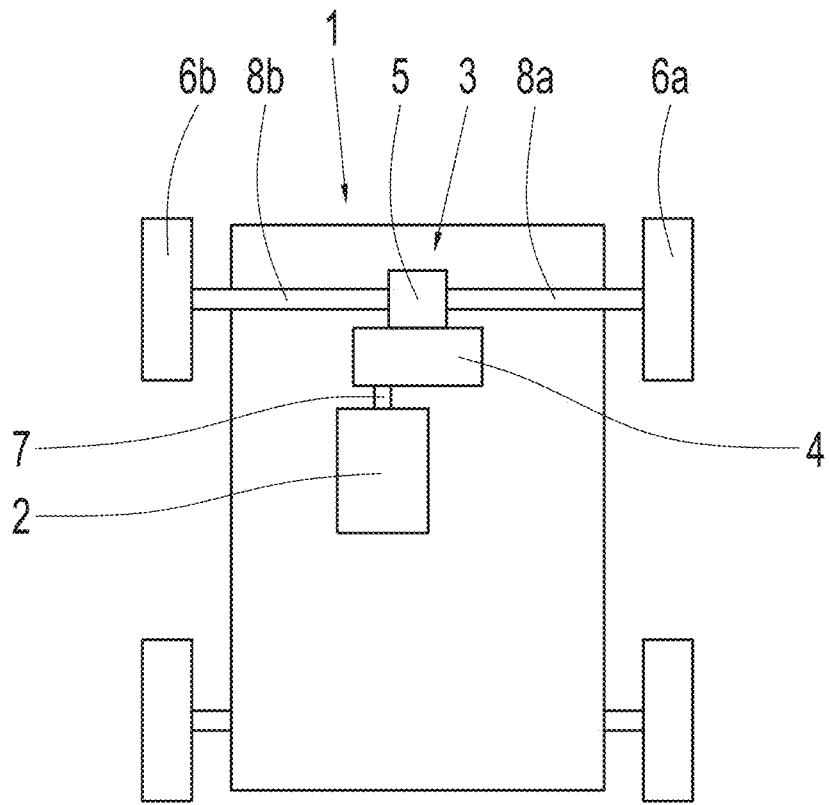
FIG. 1 shows a schematic illustration of a vehicle with a transmission assembly forming an exemplary embodiment of the present disclosure.

FIG. 1 shows a very schematic illustration of a vehicle 1 forming an exemplary embodiment of the present disclosure. By way of example, the vehicle 1 is an electrically powered motor vehicle.

The vehicle 1 has an electric axle formed by a drive unit 2 and a transmission assembly 3. The drive unit 2 is an electric machine that generates an electric drive torque. The transmission assembly 3 contains a spur gearing 4 and a differential gearing 5, in which the drive torque is conveyed by the spur gearing 4 to the differential gearing 5, and distributed to two wheels 6a, 6b by the differential gearing 5.

The transmission assembly 3 contains a drive shaft 7 forming a transmission input, and two output shafts 8a, 8b forming the transmission output. The drive shaft 7 is connected to the drive unit 2, and the two output shafts 8a, 8b are connected to the two wheels 6a, 6b. At least part of the drive torque, or output power, can be transferred from the differential gearing 5 to the wheels 6a, 6b. The differential gearing 5 is thus designed as an axle differential.

The spur gearing 4 is a reduction gearing, with a gear ration of i>1. In other words, the spur gearing 4 reduces the gear ratio. The spur gearing 4 can be a two-stage spur gearing, for example. The spur gearing 4 is thus designed to increase a torque generated by the drive unit and to reduce the rotational rate.

Figure 2:
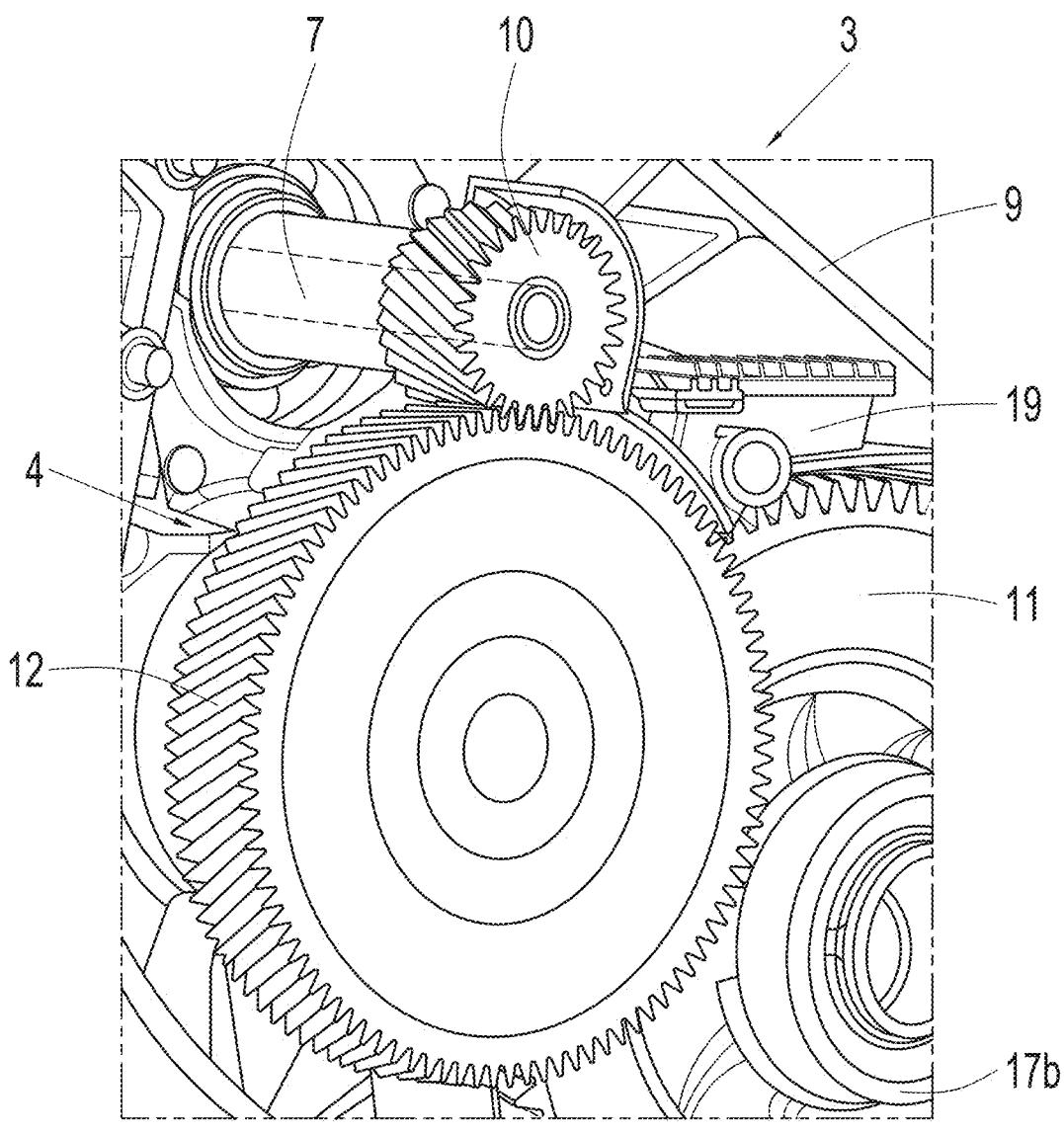
FIG. 2 shows a perspective illustration of a spur gearing in the transmission assembly.

As FIG. 2 shows, the transmission assembly 3 has a housing 9 for the spur gearing 4 and the differential gearing 5. The housing 9 is adjacent to a wet chamber that is sealed against the exterior in a fluid-tight manner. By way of example, the housing 9 can be mounted on the drive unit 2 with a flange.

The spur gearing 4 has an input gear 10 connected to the drive shaft 7 for conjoint rotation, and an output gear 11 connected to the input gear 10 by an intermediate gear 12. The drive shaft 7 enters the transmission housing 9 at the input side and thus forms the transmission input for the transmission assembly 3. The input gear 10, output gear 11, and intermediate gear 12 are each spur gears.

The intermediate gear 12 is a stepped gear, with two different diameters. The first gear stage is obtained when the input gear 10 meshes with a first section of the intermediate gear 12, which has a greater diameter than the input gear 10 to obtain the reduction. A second gear stage is obtained when a second section of the intermediate gear 12, which has a smaller diameter than the output gear 11, meshes therewith for a further reduction.

Figure 3:
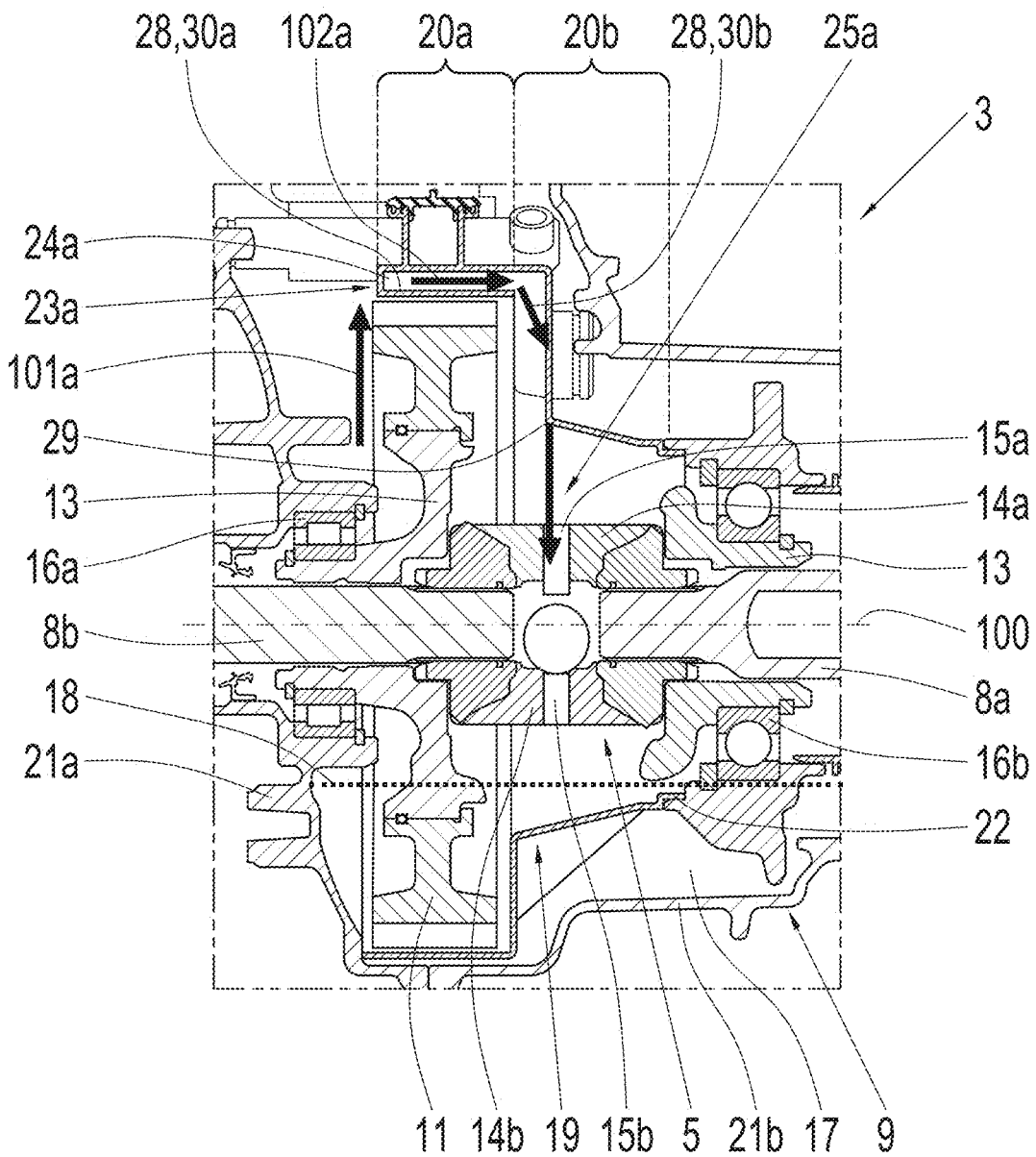
FIG. 3 shows a schematic sectional view of the transmission assembly along a rotational axis.

As shown in FIG. 3, the differential gearing 5 has a differential cage 13 connected to the output gear 11 for conjoint rotation, and numerous compensating gears 14a, 14b in the cage 13, which rotate on bearing pins 15a, 15b in the cage 13, and are connected to the two output shafts 8a, 8b. The two output shafts 8a, 8b exit the output side of the housing 9, and thus form the transmission output of the transmission assembly 3. The output gear 11, differential cage 13, and the two output shafts 8a, 8b rotate about the same axis 100 in the housing 9.

The differential gearing 5 has first and second cage bearings 16a, 16b, which support the cage 13 such that it can rotate in the housing 8. By way of example, the two differential bearings 16a, 16b are roller bearings, which support the cage 9 radially in relation to the rotational axis 100 on the housing 9. The two differential bearings 16a, 16b are spaced apart axially, and the output gear 13 as well as the compensating gears 14a, 14b are placed axially between the two cage bearings 16a, 16b.

The transmission housing 9 is filled with transmission fluid, and a sump 17 with a fluid level 18 is formed at the bottom of the housing 9 when the transmission assembly is in the stationary installed state. The transmission fluid lubricates and/or cools the transmission assembly 3, and potentially the drive unit 2.

The transmission assembly 3 contains a shielding shell 19, which is inside the transmission housing 8, and surrounds the spur gearing 4 and differential gearing 5, at least below the fluid level 18, in order to shield them from the sump 17, thus reducing drag losses in the transmission assembly 3.

The shell 19 has first and second sections 20a, 20b, the first of which surrounds the spur gearing, while the second surrounds the differential cage 13. The first shell section 20a is fitted to the output gear 11, and the second section 20b is fitted to the differential cage 13. This minimizes the gap between the output gear 11 and the first shell section 20a, and between the differential cage 13 and the second shell section 20b.

The transmission housing 9 has first and second sections 21a, 21b, which are connected axially in relation to the rotational axis, e.g. in a radial plane of the rotational axis 100, e.g. using threaded fasteners. The shell 19 fits between the first and second housing sections 21a, 21b in the axial direction in relation to the rotational axis 100, and the first shell section 20a is supported in a form-fitting and/or force-fitting manner on the first housing section 21a, while the second shell section 20b is supported on the second housing section 21 in the opposite direction.

The second shell section 20b has a radial step 22 on the end that encircles the rotational axis 100, which bears radially against the second housing section 21b. the shell 19 can be centered coaxially to the rotational axis 100 on the second housing section 21b with this radial step 22. Furthermore, the shell 19 is sealed, at least below the fluid level 18, by an elastomer seal, against which the housing sections 21a, 21b bear in a fluid-tight manner.

When the vehicle is moving, fluid from the sump 17 can enter the shell, increasing drag losses in the transmission assembly 3. The first shell section 20a has a greater outer diameter than that second shell section 20b, and the second shell section 20b has an inner surface that is slanted toward the first shell section 20a to form a conical section, such that fluid in the shell 19 is collected in the bottom of the first shell section 20a, and conveyed circumferentially by the output gear 11. This is because when the output gear 11 rotates about the rotational axis 100, its teeth convey fluid circumferentially.

To remove the fluid in the shell 19, there is a multi-stage first fluid-conducting channel 23a on the inner circumference of the first shell section 20a, through which the fluid in the first shell section 20a is conveyed by the rotation of the input gear 11 from the shell through numerous stages 24a, 24b, 24c to numerous areas 25a, 25b, 25c that require the fluid in the transmission assembly 3. A first flow path 101a for the fluid generated by the output gear 11 is divided by the first channel 23 into numerous subsidiary flow paths 102a, 102b, 102c, as indicated schematically in FIGS. 3 to 7 by arrows, such that a portion of the fluid conveyed by the rotation of the output gear 11 is conducted to the respective areas 25a, 25b, 25c.

As FIG. 3 shows, the first channel 23a has a first stage 24a, in which a first portion of the fluid is diverted to a first area 25a along a first subsidiary flow path 102a. The differential cage 13 is in the first area 25a, and the first subsidiary flow path 102a therefore leads from the output gear 11 through the first channel 23 to the cage 13, preferably at the bearing pins 15a, 15b, in order to the cool and/or lubricate the compensating gears 14a, 14b.

Figure 4:
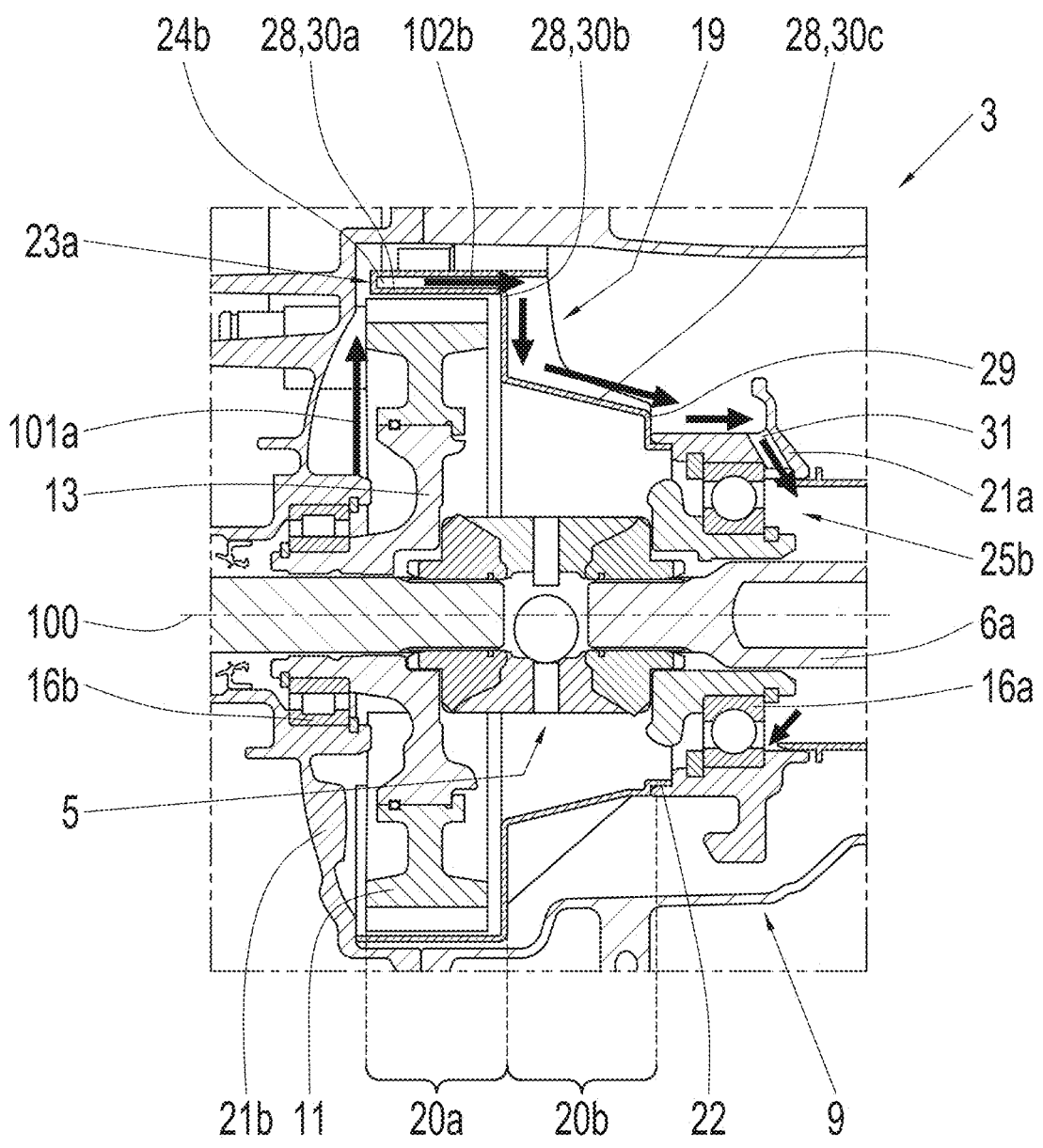
FIG. 4 shows another schematic sectional view of the transmission assembly along the rotational axis.

As FIG. 4 shows, the first channel 23 has a second stage 24b in which a second portion of the fluid is diverted along a second subsidiary flow path 102a to a first area 25a. The second cage bearing 16b is in the second area 25b, and the second subsidiary flow path 102b therefore leads from the output gear 11 through the channel 23 to the second cage bearing 16b to cool and/or lubricate it.

Figure 5:
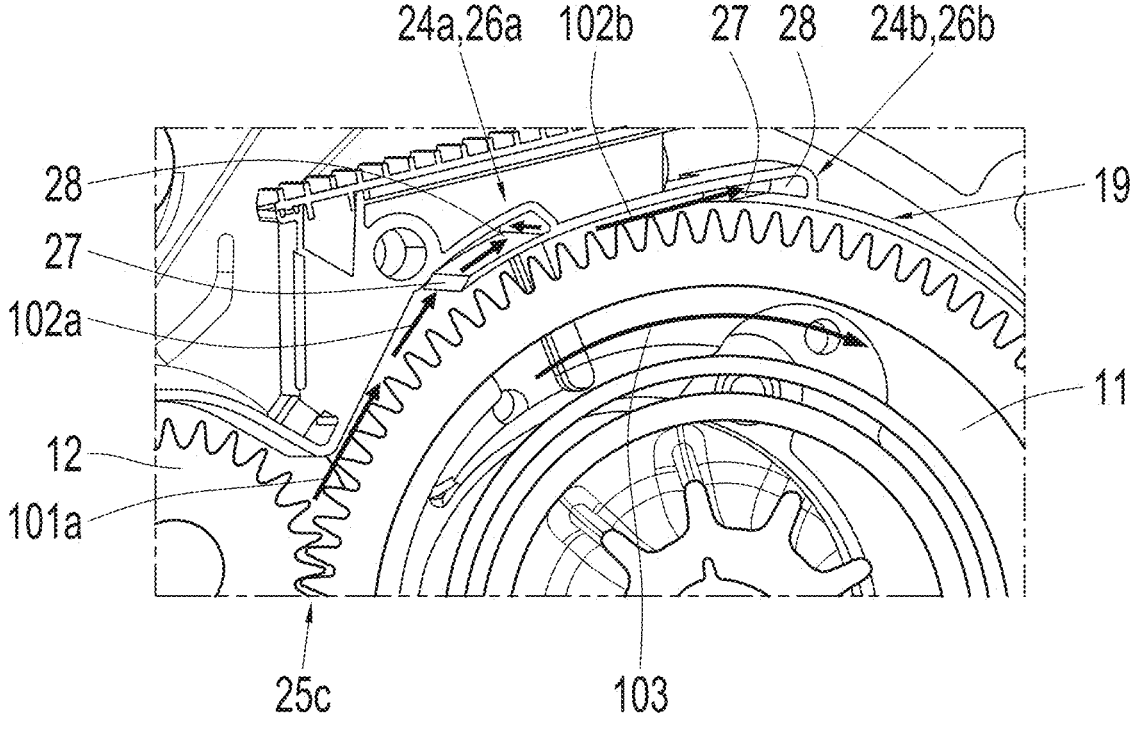
FIG. 5 shows a perspective detail of a shielding shell installed in the transmission assembly.

As FIG. 5 shows, the first stage 24a is formed by a first deflector 26a and the second stage 24b is formed by a second deflector 26b, which is downstream of the first deflector 26a in the direction 103 in which the output gear 11 rotates, and in the first flow path 101a. The two deflectors 26a, 26b each have edges 27 facing the output gear 11, and a subsequent fluid guide 28 that runs along the respective subsidiary flow path 102a, 102b to the respective areas 25a, 25b. The fluid conveyed by the output gear 11 is at least partially diverted therefrom by the edges 27 on the deflectors 26a, 26b, and conducted along the respective subsidiary flow paths 102a, 102b through the fluid guide 28 to the respective areas 25a, 25b.

As FIG. 3 shows, the fluid guide 28 in the first stage 24a connects a drip edge 29 to the deflector edge 27, and the diverted fluid is conducted along the fluid guide 28 to the drip edge 29. The drip edge 29 is radially above the differential cage 13 with respect to the rotational axis 100, preferably at a 12 o'clock position, such that the fluid diverted along the first subsidiary flow path 102a can drip onto the cage 13 or bearing pins 15a, 15b. The first subsidiary flow path 102a changes direction numerous times in the fluid guide 28, in order to conduct the fluid toward the cage 13.

The fluid guide 28 in the first lubricating stage 24a has a first section 30a and second section 30b, the first of which axially diverts the first subsidiary flow path 102a to the first shell section 20a, while the second radially diverts the first subsidiary flow path 102a toward the differential cage 13 at the first shell section 20a. The deflector edge 27 is at the start of the first channel section 30a, and the drip edge 29 is at the end of the second channel section 30b.

As FIG. 4 shows, the fluid guide 28 in the second stage 24b connects a drip edge 29 to the deflector edge 27, such that the fluid is conducted along the fluid guide 28 to the drip edge 29. The drip edge 29 is radially above the second housing section 21 in relation to the rotational axis 100, where the second cage bearing 16b is located, such that the fluid diverted along the second subsidiary flow path 102b can be conveyed over the second housing section 21a to the second cage bearing 16b. The first housing section 21a has at least one lubricant opening 31 for this, through which the fluid conducted along the second subsidiary flow path 102b is supplied directly to the second area 25b, in particular a bearing seat for the second cage bearing 16b. The second subsidiary flow path 102b changes direction numerous times in the fluid guide 28, to divert the fluid toward the second cage bearing 16b, or the at least one lubricant opening 31.

The fluid guide 28 in the second stage 24b has a first section 30a, second section 30b, and third section 30c, the first of which diverts the second subsidiary flow path 102b at the first shell section 20a axially toward the second cage bearing 16b, the second section 30b diverts the second subsidiary flow path 102b at the first shell section 20a radially toward the second cage bearing 16b, and the third section 30c diverts the second subsidiary flow path 102b at the second shell section 10b axially toward the second cage bearing 16b. The deflector edge 27 is at the start of the first channel section 30a, and the drip edge 29 is at the end of the third channel section 30c.

Figure 6:
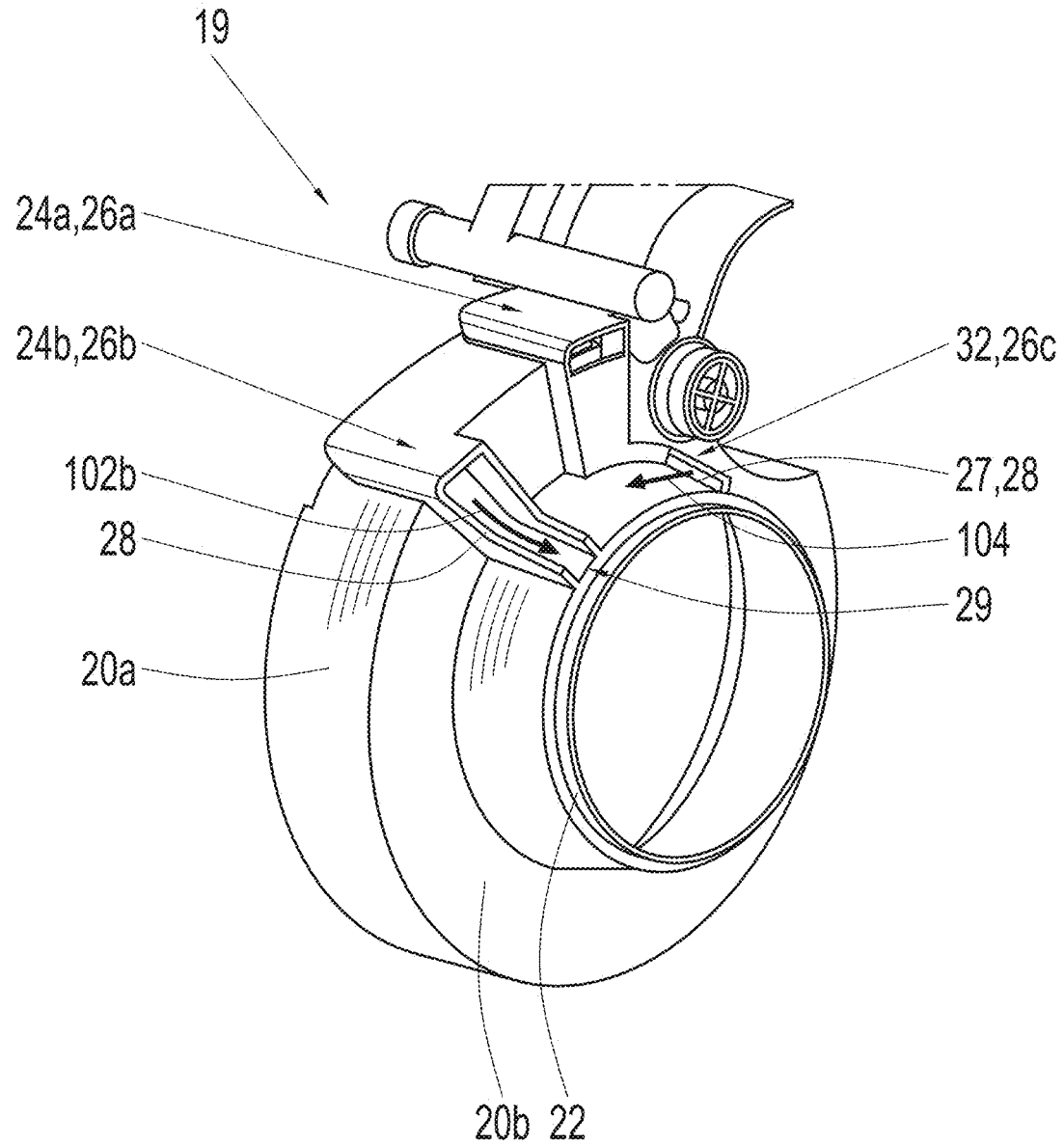
FIG. 6 shows a three-dimensional illustration of the shielding shell.

As FIG. 6 shows, at least the second shell section 20b is closed over its circumference, such that the differential gearing 5 is entirely enclosed between the two housing sections 21a, 21b by the shell 19, or the second shell section 20b. To remove the excess fluid above the areas 25a, 25b for the differential gearing 5 from the shell 19, the second shell section 20b has another channel 32 through which residual fluid is diverted along another flow path 104 directly to the sump 17, as shown in FIG. 3. This takes place because when the differential cage 14 rotates about the rotational axis 100, it conveys fluid over its outer circumference. The other flow path 104 therefore leads from the differential cage 14 through the other channel 32 to the sump 17.

The other channel 32 is formed by another deflector 26c, which is on the inner circumference of the second shell section 20b. The other deflector 26b has a deflector edge 27 facing the differential cage 13, like the first two deflectors 26a, 26b, and a fluid guide 28 adjoining the deflector edge 27, which runs along the other flow path 104 to the sump 17. At least part of the fluid conveyed by the cage 13 is diverted by the other deflector 26b at the edge 27 thereof from the cage 13, along the other flow path 104 through the fluid guide 28 to the sump 17.

Figure 7:
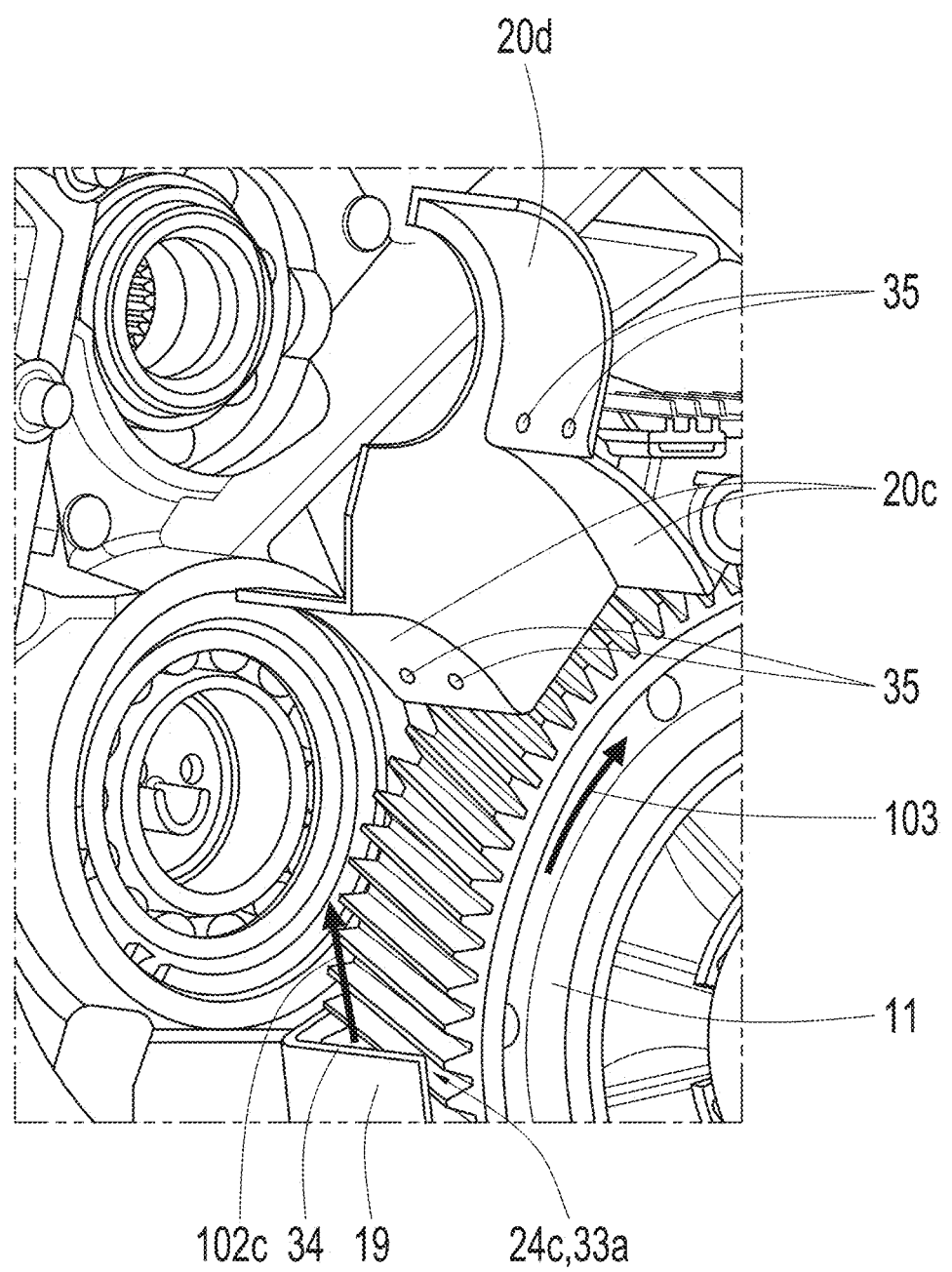
FIG. 7 shows another detail view of the installed shielding shell.

As FIG. 7 shows, the multi-stage first channel 23a has a third stage 24c through which another portion of the fluid is diverted along a third subsidiary flow path 102b to a third area 25c, as shown in FIG. 5. The third area 25c is where the output gear 11 meshes with the intermediate gear 12, and the third subsidiary flow path 102c thus flows from the output gear 11 through the first channel 23a to this area in order to cool and/or lubricate the output gear 11 and the intermediate gear 12.

The third stage 24b is formed by a spin-off channel 33 upstream or downstream of the first and second deflectors 26a, 26b in the rotational direction 103 of the output gear 11. The spin-off channel 33 has a spin-off edge 34 facing away from the output gear 11, where the fluid is diverted along the third subsidiary flow path 102c to the third area 25c. At least part of the fluid conveyed by the output gear 11 is removed therefrom by the edge 34 of the spin-off channel 33, and conducted along the third subsidiary flow path 102c radially and/or tangentially to the rotational direction 103. The spin-off edge 33 is radially below the meshing area in relation to the rotational axis 100, preferably at the 9 o'clock position, such that the fluid conducted along the third subsidiary flow path 102c can be diverted from below into the meshing area.

As shown in FIG. 7, the shielding shell 9 has other sections 20c, 20d, the third section 20c of which surrounds a part of the intermediate gear 12, while the fourth section 20c surrounds part of the input gear 10. The third shell section 20c is fitted to the intermediate gear 12, in particular both sections thereof, and the fourth shell section 20c is fitted to the input gear 10.

To supply fluid to the areas where the input gear 10 meshes with the intermediate gear 12, and where the output gear 11 meshes with the intermediate gear 12, the two shell sections 20c, 20d can have openings 35 that open into the respective meshing areas. These openings 35 can be connected to a pump that conveys fluid from the sump 17 through the openings 35 into the meshing areas. The excess fluid can then be conveyed by the output gear 10 through the first channel 23a, or the second channel 24, to the transmission housing 9.

Figure 8:
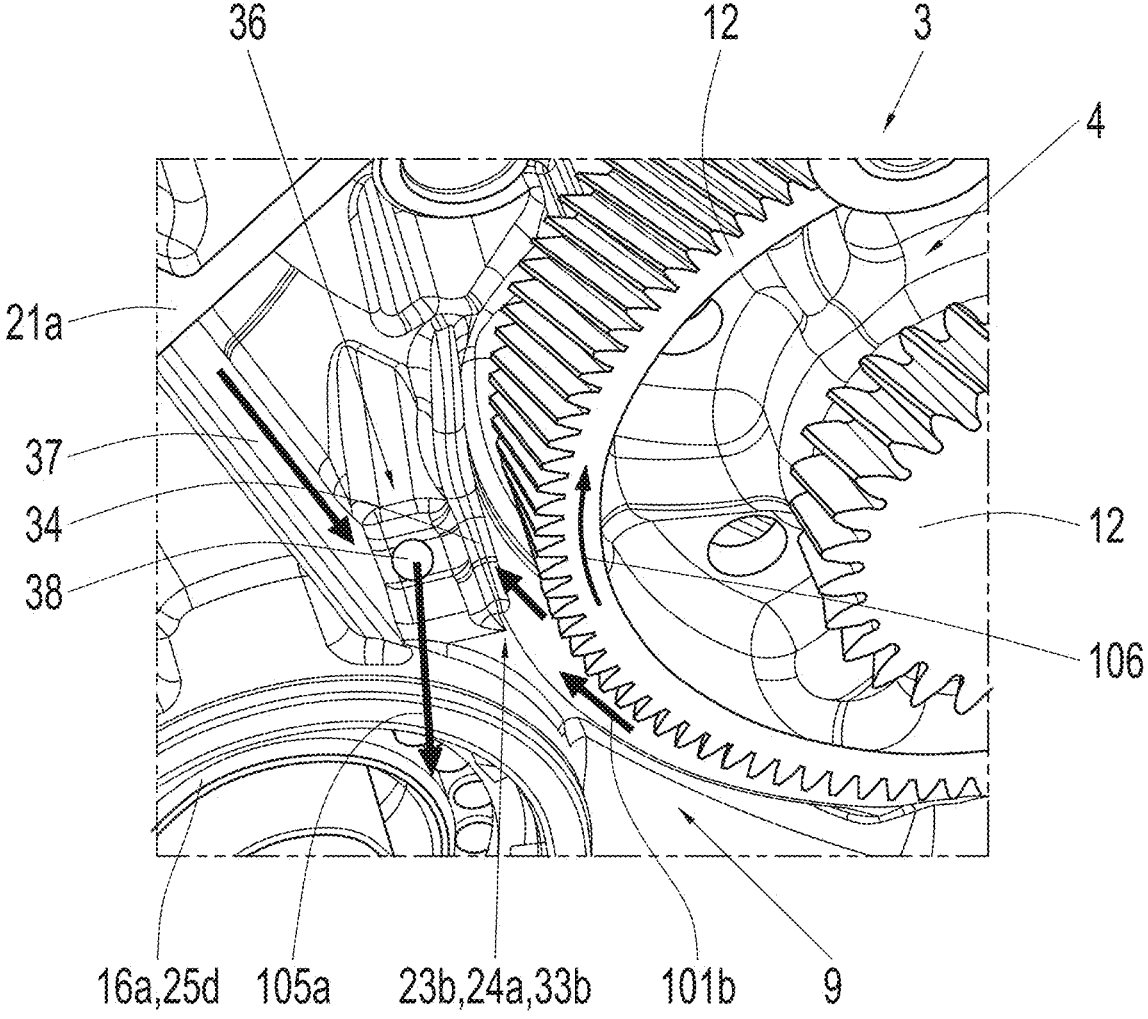
FIG. 8 shows a detail of an installed transmission housing for the transmission assembly.
Figure 9:
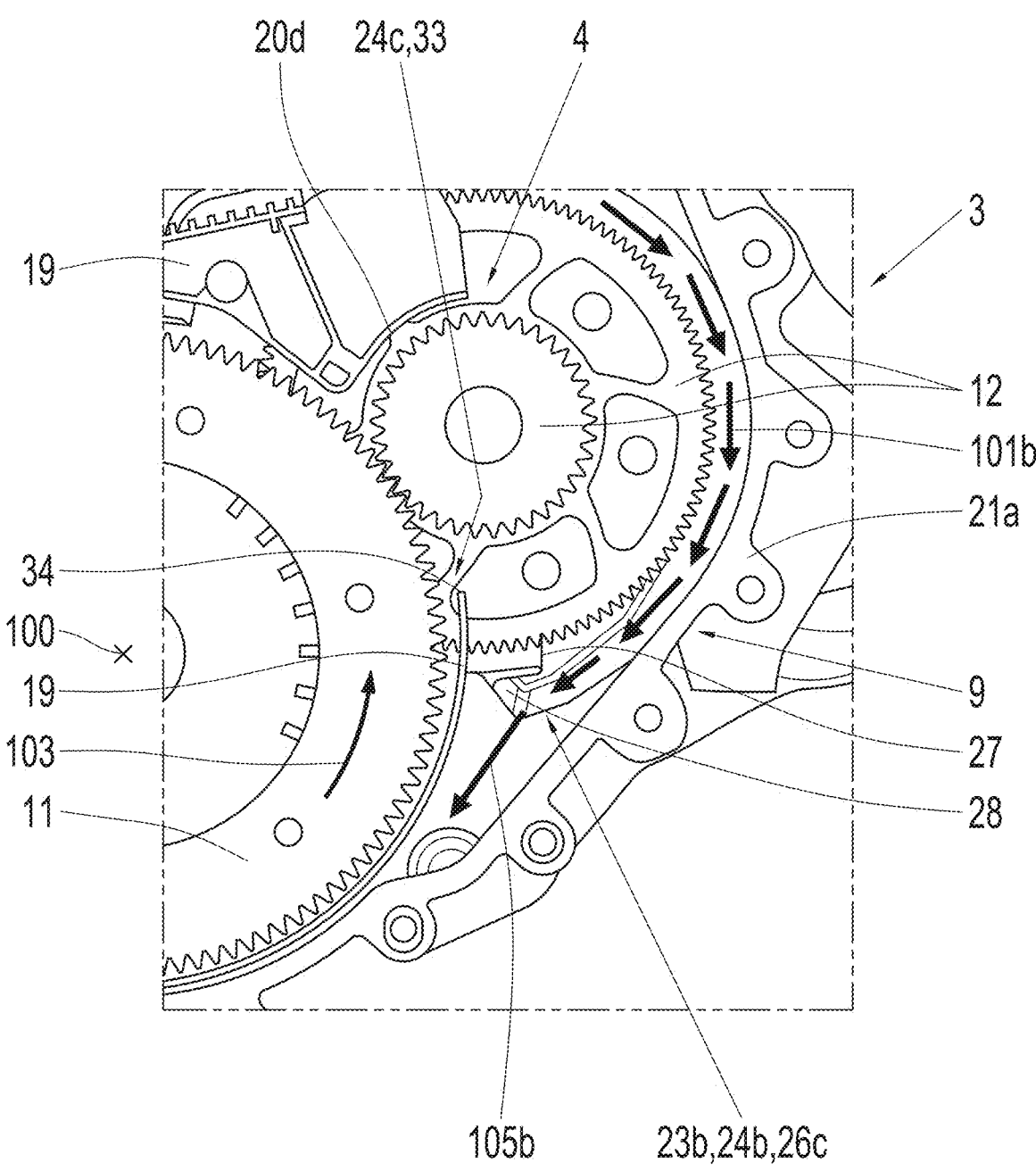
FIG. 9 shows another detail of the installed transmission housing.

As shown in FIGS. 8 and 9, the transmission housing 9, in particular the first section 21a, has a second channel 23b through which excess fluid conveyed by the intermediate gear 12 can be conducted along a second flow path 101b from the shell 19 to a fourth area 25d and/or directly into the sump 17. This is because the fluid is conveyed by the rotation of the intermediate gear 12 over its circumference. The second channel 23b can have numerous stages, and the second flow path 101b is divided into numerous, preferably two, subsidiary flow paths 105a, 105b, indicated schematically by arrows.

As shown in FIG. 8, the second channel 23b has a first stage 24a through which a first portion of the fluid is diverted along the first subsidiary flow path 105a to the fourth area 25d. The first differential cage bearing 16b is in fourth area 25d and the first subsidiary flow path 105a therefore flows from the intermediate gear 12 through the first stage 24a of the second channel 23b to the first cage bearing 16a in order to cool and/or lubricate it.

The first stage 24a in the second channel 23b is formed by another spin-off channel 33b, which has an edge 34 facing away from the intermediate gear 12, where fluid is diverted along a first subsidiary flow path 105a to a reservoir 36. At least part of the fluid conveyed by the intermediate gear 12 is diverted by the edge 34 of the spin-off channel 33b along the first subsidiary flow path 105a radially and/or tangentially to the rotational direction 106.

The fluid reservoir 36 is adjacent to the spin-off channel 33b, such that fluid diverted by the spin-off edge 34 is conducted through one or more surfaces 37 formed on the transmission housing 9 into the reservoir 36 and collected there. These surfaces 37 can be slanted toward the reservoir 37, such that the fluid is diverted there into the reservoir 37, as indicated schematically by an arrow.

The reservoir 36 is offset to the spin-off edge 34, and delimited by the spin-off channel 33b, thus retaining the fluid in the reservoir 36. There is at least one hole 38 in the reservoir 36, through which the fluid therein can drain toward the fourth area 25d. The first subsidiary flow path 105a thus flows from the intermediate gear 12 through the other spin-off channel 33b and the reservoir 36 to the fourth area 25d.

As shown in FIG. 9, the second channel 23b has a second stage 24b through which excess fluid is diverted along the second subsidiary flow path 105b directly into the sump 17. The second subsidiary flow path 105b thus flows from the intermediate gear 12 through the second stage 24b in the second channel 23b into the sump 17.

The second stage 24a of the second channel 23b is formed by another deflector 26d, which is downstream of the other spin-off channel 33b in the rotational direction 107 of the intermediate gear 12 on the inner surface of the first housing section 21a. The other deflector 26d is an integral channel molded onto the first housing section 21a, which has a deflector edge 27 facing the intermediate gear 12 and a channel adjoining this edge 27, along which the second subsidiary flow path 105b flows into the sump 17. At least part of the fluid conveyed by the intermediate gear 12 is removed therefrom by the edge 27 of the other deflector 26d, and conducted along the second subsidiary flow path 105b through the fluid guide 28 into the sump 17. This edge 27 is formed by fins that are tangential to the intermediate gear 12, and the fluid guide 28 is formed by a drain adjoining the fins.

REFERENCE SYMBOLS 1 vehicle
2 drive unit
3 transmission assembly
4 spur gearing
5 differential gearing
6a, b vehicle wheels
7 drive shaft
8a, 8b output shafts
9 transmission housing
10 input gear
11 output gear
12 intermediate gear
13 differential cage
14a, b compensating gears
15a, b bearing pins
16a, b differential cage bearings
17 sump
18 fluid level
19 shielding shell
20a-c shell sections
21a, b housing sections
22 radial step
23a, b fluid-conducting channel
24a-c fluid-conducting stages

15

25*a-d* areas needing fluid
26*a-d* fluid deflectors
27 deflector edge
28 fluid channel
29 drip edge
30*a-c* fluid channel sections
31 lubricant opening
32 other fluid-conducting channel
33*a, b* spin-off channel
34 spin-off edge
35 fluid supply opening
36 fluid reservoir
37 fluid-conducting surface
38 hole in the housing
100 rotational axis
101*a, b* fluid flow path
102*a-c* subsidiary flow path
103 rotational direction
104 other fluid flow path
105*a, b* other subsidiary flow path
106 rotational direction

The invention claimed is:

1. A transmission assembly for a motor vehicle comprising:
   a transmission housing;
   a spur gearing in the housing, wherein the spur gearing has an input gear and an output gear that are connected to one another;
   a differential gearing in the housing, wherein the differential gearing has a differential cage connected to the output gear for conjoint rotation, and numerous compensating gears rotatably supported in the cage;
   a sump that defines a fluid level in the transmission housing when the installed transmission assembly is stationary; and
   a shielding shell in the transmission housing that surrounds the output gear and the differential cage, at least below the fluid level, to shield them against the sump,
   wherein the shell has a first plurality of channels configured to convey fluid in the shell from the shell along the first plurality of channels to at least one area in the transmission assembly, and
   wherein the first plurality of channels is configured to convey fluid therethrough to different areas, and wherein a first channel of the first plurality of channels is configured to convey fluid via a first inlet and a second channel of the first plurality of channels is configured to convey fluid via a second inlet.

2. The transmission assembly according to claim 1, wherein the first channel is formed by a first deflector that is adjacent to the output gear, wherein the first deflector has a first edge configured to divert fluid, and the first channel configured to conduct this fluid to a first area of the different areas where it is needed.

3. The transmission assembly according to claim 2, wherein the differential cage is in the first area, wherein the first channel connects the first edge of the first deflector to a first drip edge above the differential cage.

4. The transmission assembly according to claim 2, wherein the second channel is formed by a second deflector that is downstream of the first deflector adjacent to the output gear, wherein the second deflector has a second edge facing the output gear configured to divert fluid, and the second channel is configured to conduct this fluid to a second area of the different areas where it is needed.

5. The transmission assembly according to claim 4, wherein the differential cage is rotatably supported in the housing by at least one cage bearing, and the cage bearing is in the second area, wherein the second channel connects the second edge of the second deflector to a second drip edge above the cage bearing.

6. The transmission assembly according to claim 1, wherein a third channel of the first plurality of channels is a spin-off channel that is adjacent to the output gear, wherein the spin-off channel has an edge facing away from the output gear where fluid is diverted to a third area of the different areas where it is needed.

7. The transmission assembly according to claim 6, wherein a meshing area where the input gear and the output gear mesh is in the third area, and wherein the edge of the spin-off channel is below the meshing area.

8. The transmission assembly according to claim 1, wherein the shielding shell has another channel that is configured such that fluid in the shell is conveyed by rotation of the differential cage from the shell along the another channel directly into the sump.

9. The transmission assembly according to claim 1, wherein the transmission housing has a second plurality of channels that is configured such that fluid in the shell is conveyed by rotation of one of the gears in the spur gearing from the shell along the second plurality of channels directly into the sump and/or to the at least one area where it is needed.

10. The transmission assembly according to claim 1, wherein the shell has at least one opening configured to actively supply fluid, wherein the opening opens into a meshing area for the input gear or the output gear.

11. The transmission assembly according to claim 1, wherein the shell has a first section surrounding the output gear, and a second section surrounding the differential cage, wherein at least the second section is closed over its circumference.

12. The transmission assembly according to claim 1, wherein the shell is secured in a form-fitting manner between first and second housing sections of the transmission housing, at least in an axial direction in relation to a rotational axis, wherein a first shell section is supported in a fluid-tight manner, at least below the fluid level, on the first housing section, and a second shell section is supported in a fluid-tight manner, at least below the fluid level, on the second housing section.

13. A motor vehicle comprising:
   the transmission assembly according to claim 1.

14. A transmission assembly for a motor vehicle comprising:
   a transmission housing;
   a spur gearing in the housing, wherein the spur gearing has an input gear and an output gear that are connected to one another;
   a differential gearing in the housing, wherein the differential gearing has a differential cage connected to the output gear for conjoint rotation, and numerous compensating gears rotatably supported in the cage;
   a sump that defines a fluid level in the transmission housing when the installed transmission assembly is stationary; and
   a shielding shell in the transmission housing that surrounds the output gear and the differential cage, at least below the fluid level, to shield them against the sump, wherein the shell has a first plurality of channels config-
  ured to convey fluid in the shell from the shell along the
  first plurality of channels to at least one area in the
  transmission assembly, wherein the transmission housing has a second plurality
  of channels that is configured such that fluid in the shell
  is conveyed by rotation of one of the gears in the spur
  gearing from the shell along the second plurality of
  channels directly into the sump and/or to the at least
  one area where it is needed.

* * * * *